(12) United States Patent
Newman et al.

(10) Patent No.: US 7,200,358 B1
(45) Date of Patent: *Apr. 3, 2007

(54) DETACHABLE WIRELESS TRANSCEIVER FOR MOBILE MARINE COMMUNICATIONS APPARATUS

(75) Inventors: Kent David Newman, Hurst, TX (US); Arthur Y. Tsubaki, Cherry Valley, IL (US)

(73) Assignee: Uniden America Corporation, Ft. Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/274,439

(22) Filed: Nov. 15, 2005

Related U.S. Application Data

(63) Continuation-in-part of application No. 11/110,566, filed on Apr. 20, 2005, which is a continuation-in-part of application No. 10/206,502, filed on Jul. 26, 2002, now Pat. No. 6,980,770.

(51) Int. Cl.
*H04B 7/15* (2006.01)

(52) U.S. Cl. .................... 455/11.1; 455/573; 455/569.1

(58) Field of Classification Search .............. 455/11.1, 455/573, 38.1; 340/425.5
See application file for complete search history.

(56) References Cited

U.S. PATENT DOCUMENTS

| | | | | |
|---|---|---|---|---|
| 5,163,158 A | * | 11/1992 | Tendler et al. | ............. 455/11.1 |
| 2002/0177473 A1 | * | 11/2002 | Skinner et al. | ............. 455/573 |
| 2003/0085805 A1 | * | 5/2003 | Paulo | ...................... 340/425.5 |

* cited by examiner

*Primary Examiner*—Jean Gelin
*Assistant Examiner*—Phuoc Doan
(74) *Attorney, Agent, or Firm*—Lawrence R. Youst; Kenneth T. Emanuelson; Danamraj & Youst, P.C.

(57) ABSTRACT

A detachable wireless transceiver module (306, 308) operable to communicate with a marine radio wireless communication system (10) on board a waterborne vessel (12) is disclosed. The module is designed to be secured and operably connected to a handheld marine radio (250) in order to provide local wireless communications capability thereto. The enhanced handheld marine radio (250) is operable to communicate directly with one or more fixed mount marine radios (18, 38) and/or wireless handsets (26, 46, 50, 52) via local wireless channels.

19 Claims, 9 Drawing Sheets

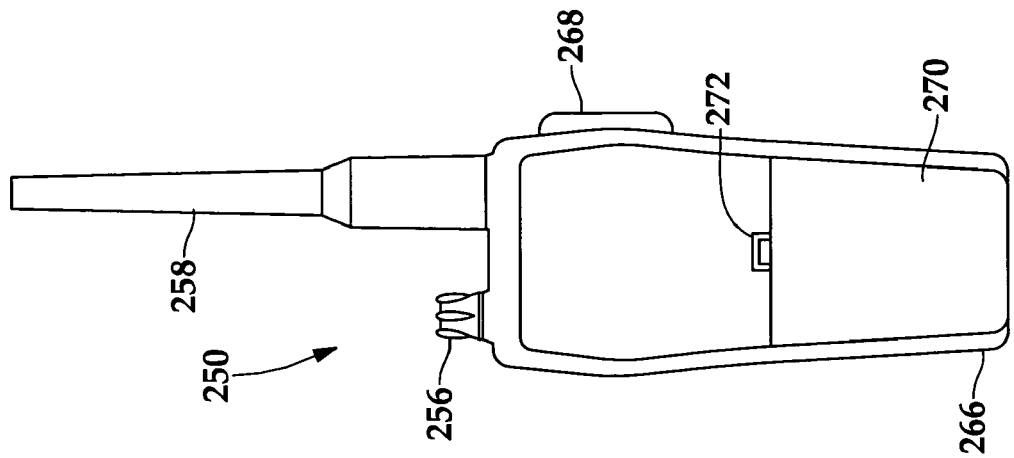
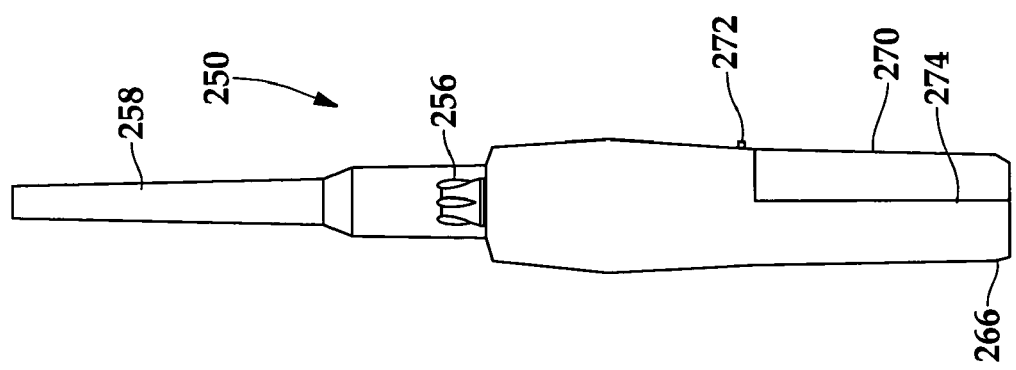
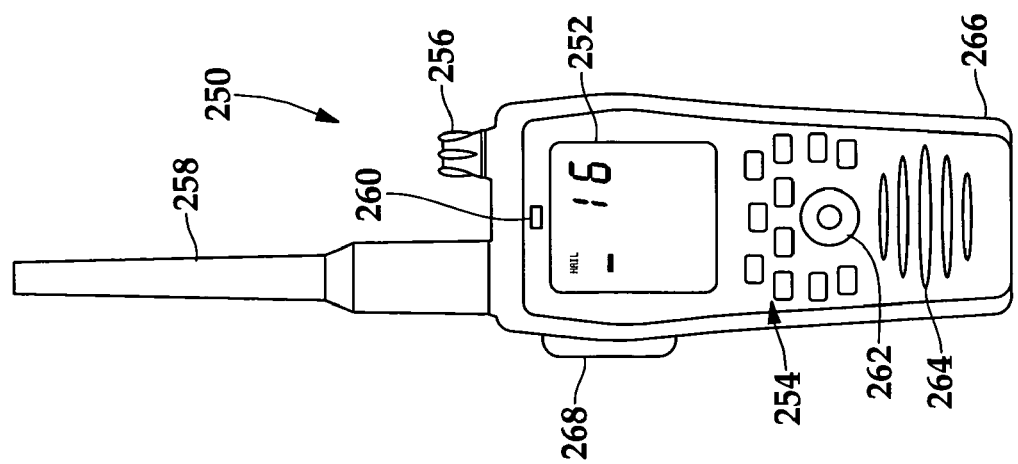

DETACHABLE WIRELESS TRANSCEIVER FOR MOBILE MARINE COMMUNICATIONS APPARATUS

CROSS-REFERENCE TO RELATED APPLICATIONS

This application is a continuation-in-part application of U.S. utility patent application Ser. No. 11/110,566 entitled "Mobile Marine Communications Apparatus and Method for Use of Same" filed Apr. 20, 2005, which is a continuation-in-part application of U.S. utility patent application Ser. No. 10/206,502 entitled "Mobile Marine Communications Apparatus" filed Jul. 26, 2002 now U.S. Pat. No. 6,980,770.

TECHNICAL FIELD OF THE INVENTION

This invention relates, in general, to the transmission of marine radio frequency communications between marine radio stations and, in particular, to a detachable wireless transceiver for a handheld marine radio.

BACKGROUND OF THE INVENTION

A shipboard radio station includes all of the transmitting and receiving equipment installed aboard a ship for communications afloat. Depending on the size, purpose or destination of a ship, its radio station must meet certain requirements established by law or treaty. For example, large passenger or cargo ships that travel on the open sea are required by the Communications Act and by international agreements to be equipped with a radio station for long distance radio communications. Passenger ships that travel along the coast must be able to communicate at shorter range with coast stations. These are examples of "compulsory ships" because they are required or compelled by treaty or statute to be equipped with specified communications equipment.

Smaller ships used for recreation, e.g., sailing, diving, fishing or water skiing, are not required to have radio stations installed but they may be so equipped by choice. These ships are known as "voluntary ships" because they are not required by treaty or statute to carry a radio but may voluntarily fit some of the same equipment used by compulsory ships.

A shipboard radio station may communicate with other ship stations or coast stations primarily for safety, and secondarily for navigation and operational efficiency. The FCC regulates marine communications in cooperation with the U.S. Coast Guard, which monitors marine distress frequencies continuously to protect life and property. Ship station equipment often includes a fixed mount marine radio frequency transceiver, a radar system, Emergency Position Indicating Radio Beacons (EPIRBs), single sideband radio-telephones and satellite radios.

In particular, marine radio frequency transceivers, generally referred to as "marine radios" or sometimes "marine transceivers," are an important part of a marine communication system. A marine radio can be employed to call a remote ship station, place a call through a public coast station, receive a shore to ship call or initiate a marine distress call. For example, an operator places a call to a remote ship station by first ensuring that the fixed mount marine radio is operational. The operator then selects Channel 16 (156.8 MHz) and listens to make sure it is not being used. Alternatively, Channel 9 (156.45 MHz) may be used by recreational vessels for general purpose calling. This frequency should be used whenever possible to relieve congestion of Channel 16. When the channel is quiet, the operator places the call to the ship. The operator speaks directly into the fixed mount marine radio microphone in a normal tone of voice with clarity and distinctiveness and states "[name of ship being called] THIS IS [the name and call sign (if applicable) of the ship where the call is being placed]." Once contact is made on Channel 16, the ships switch to a ship-to-ship channel. For example, if the call regards a noncommercial message, Channel 71, 72 or 78 may be selected. Alternatively, if the call regards a navigational message, Channel 13 or 67 may be selected. After communications are completed, each ship provides its call sign or ship name and switches back to Channel 16.

Certain marine radios are fixed, while others are handheld. Fixed mount marine radios are fixed mounted at the radio station of the vessel. Usually, the radio station of the vessel is positioned at the bridge. Although a fixed mount marine radio can be very useful for communications between the bridge and vessels and locations outside of the vessel, such a radio does not provide portability. On the other hand, while handheld marine radios provide portability, they are limited as to power and effective range.

SUMMARY OF THE INVENTION

The present invention disclosed herein relates to a detachable wireless transceiver module for a handheld marine radio, along with radios and systems incorporating the detachable transceiver module. The detachable wireless transceiver module of the present invention enables a crew member to communicate over a shipboard wireless communications system.

According to a first aspect, the present invention is a detachable wireless transceiver module for facilitating communications between a handheld marine radio and a first wireless marine radio component of a marine radio frequency communication system disposed on-board a waterborne vessel. The detachable wireless transceiver module comprises a module case having an outer surface and a battery disposed within the case. A set of transceiver battery contacts are operably connected to the battery, disposed in a manner to provide connection to corresponding handheld radio contacts operably connected to the handheld marine radio. The module incorporates a transceiver signal connector, disposed in such a manner as to provide connection to a handheld radio signal connector operably connected to the handheld marine radio. The module comprises a transceiver interface adapted to communicate with the handheld marine radio via the transceiver signal connector and a wireless transceiver, operably connected to the transceiver interface and adapted to establish a wireless communication link with the first wireless marine radio component and to transmit a wireless signal incorporating an acoustic input signal over the first wireless communication link.

According to a second aspect, the present invention is a handheld marine radio operable to communicate within a marine radio frequency communication system disposed on-board a waterborne vessel. The handheld marine radio comprises a microphone, a speaker, a marine radio transceiver, a first antenna operably connected to the marine radio transceiver, a microprocessor operably connected to the microphone, the speaker, the marine radio transceiver and a detachable wireless transceiver module. The detachable wireless transceiver module comprises a module case having an outer surface, a battery, transceiver battery contacts, a transceiver signal connector, a transceiver interface and a wireless transceiver. The wireless transceiver is operably connected to the transceiver interface and adapted to establish a wireless communication link with the first wireless marine radio component and to transmit a wireless signal incorporating an acoustic input signal over the first wireless communication link.

According to a third aspect, the present invention is wireless marine radio system. The system comprises a handheld marine radio and a wireless marine radio component. The handheld marine radio includes a first microphone, a first speaker, a first local wireless transceiver disposed within a detachable wireless transceiver module and operably connected to a first local wireless antenna disposed within the detachable wireless transceiver module and a first processor operable to coordinate communication between the first microphone, the first speaker and the first local wireless transceiver. The wireless marine radio component includes a second microphone, a second speaker, a second local wireless transceiver operably connected to a second local wireless antenna and a second processor operable to coordinate communication between the second microphone, the second speaker and the second local wireless transceiver. The handheld marine radio and second local wireless transceiver are operable to establish a local wireless link through the first and second local wireless antennas. Each of the first and second processors communicate signals from the respective first and second microphones across the wireless link and communicate signals received across the wireless link to the respective first and second speakers.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 6 is a front elevation view of a handheld marine radio of the present invention;

FIG. 7 is a side elevation view of the handheld marine radio of the present invention;

FIG. 8 is a back elevation view of the handheld marine radio of the present invention;

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Figure 1:
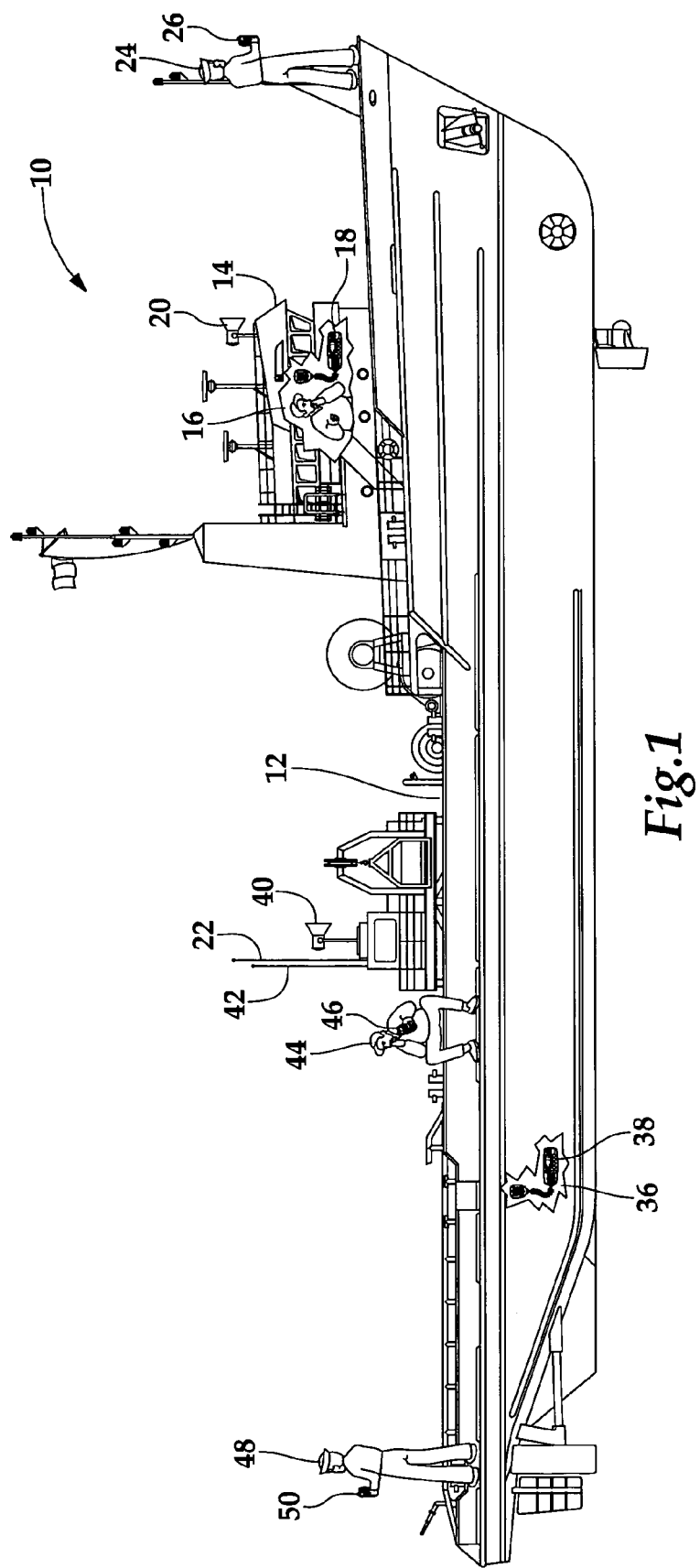
FIG. 1 is a schematic illustration with partial cut away of a wireless marine communications system of the present invention.

Referring initially to FIG. 1, a wireless marine communications system 10 suitable for use with the present invention is shown employed in a marine vessel 12. A first shipboard radio station 16 positioned at the bridge 14 of marine vessel 12 is fitted with a first fixed mount marine radio frequency transceiver, or "marine radio" 18. A loud speaker 20 and antenna 22 are coupled to fixed mount marine radio 18 to provide audio and wireless marine communications, respectively. Preferably, fixed mount marine radio 18 is a very high frequency (VHF) frequency modulation (FM) transceiver that allows shipboard radio station 16 to communicate with other remote shipboard radio stations (not shown) and coast stations (not shown) over relatively short distances by generating and receiving frequency modulated electromagnetic (EM) signals at certain predetermined radio frequency channels, specifically marine radio frequency channels. In certain embodiments, fixed mount marine radio 18 is able to send and receive on all USA, Canadian and International marine radio frequency channels.

On the deck of vessel 12, seaman 24 is holding a marine radio remote wireless handset 26 which wirelessly communicates with fixed mount marine radio 18. In certain embodiments, the marine radio remote wireless handset 26 may enable an operator to send and receive marine communications from any position on waterborne marine vessel 12. For example, as illustrated, seaman 24 is positioned towards the bow of the marine vessel 12 and away from the bridge 14 and fixed mount marine radio 18. Marine radio remote wireless handset 26, however, provides communication capability between seaman 24 and bridge 14 via wireless communication with fixed mount marine radio 18. As such, marine radio remote wireless handset 26 provides intercom communication with the bridge 14. In addition, marine radio remote wireless handset 26 may also provide the capability to make and receive marine radio frequency calls via fixed mount marine radio 18. It should be apparent to those skilled in the art that while fixed mount marine radio 18 sends and receives inter-vessel marine communications on a wide band of marine frequencies, such as VHF band, over relatively great distances, marine radio remote wireless handset 26 may receive intra-vessel marine communications at a different frequency band.

A second shipboard radio station 36 positioned at the stern of marine vessel 12 is fitted with a second fixed mount marine radio frequency transceiver 38. As above, a loud speaker 40 and antenna 42 are coupled to fixed mount marine radio 38 to facilitate audio and marine radio frequency communications, respectively. Similar to fixed mount marine radio 18, fixed mount marine radio 38 is in certain embodiments able to send and receive on all USA and International marine channels. Accordingly, fixed mount marine radio 38 may serve as a fully-functional backup radio in the event that fixed mount marine radio 18 experiences a malfunction. Seamen 44, 48 are holding marine radio remote wireless handsets 46, 50 respectively which wirelessly communicate with fixed mount marine radio 38. In certain embodiments, the marine radio remote wireless handsets 46, 50 may enable seamen 44, 48 to send and receive marine radio frequency communications through fixed mount marine radio 38 from any position on marine vessel 12.

Each marine radio remote wireless handset 26, 46, 50 is operable to transmit messages to and receive messages from the fixed mount marine radio 18 or 38 to which it is wirelessly linked. Further, in certain embodiments each marine radio remote wireless handset 26, 46, 50 is operable to communicate with each of the other marine radio remote wireless handsets 26, 46, 50 in the marine communications system 10. In such embodiments, seaman 24 is able to communicate with seaman 44 by means of the marine radio remote wireless handsets 26, 46 carried by the two.

Figure 2:
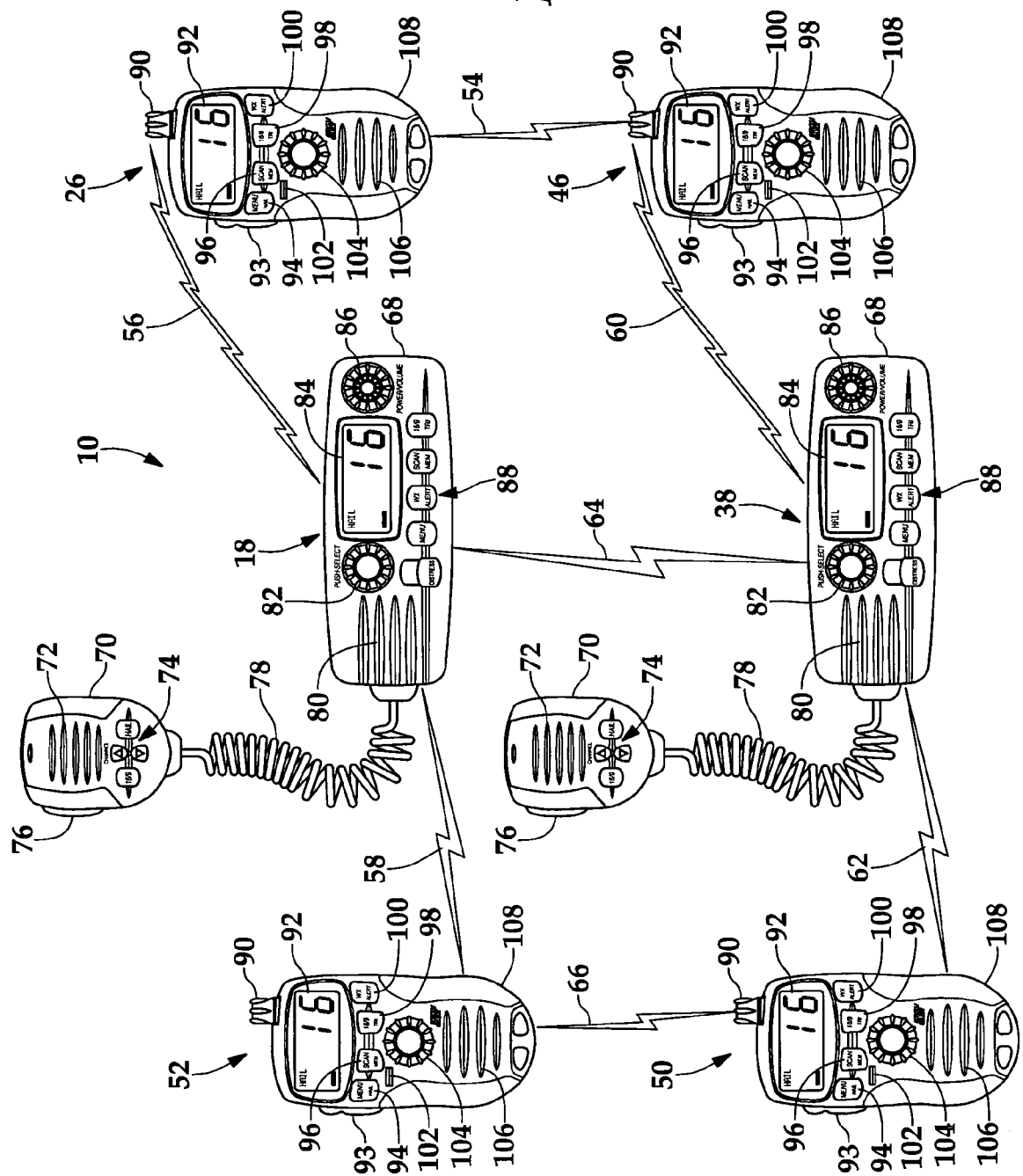
FIG. 2 is a schematic illustration of the wireless marine communications system of the present invention.

Referring now to FIG. 2, wireless marine radio communication system 10 is illustrated schematically. A first fixed mount marine radio 18 is in direct wireless communication with marine radio remote wireless handset 26, marine radio remote wireless handset 52 and fixed mount marine radio 38 as represented by communication lines 56, 58 and 64 respectively. A second fixed mount marine radio 38 is in direct wireless communication with marine radio remote wireless handset 46, marine radio remote wireless handset 50 and fixed mount marine radio 18, as represented by communication lines 60, 62 and 64 respectively. In certain embodiments, the wireless communication may occur at 900 MHz, 2.4 Ghz or 5.8 GHz. It should be understood, however, that fixed mount marine radios 18, 38 and marine radio remote wireless handsets 26, 46, 50, 52 may communicate at other frequencies depending on multiple considerations including technological limitations, manufacturing costs and government regulations.

Each fixed mount marine radio 18, 38 includes a fixed transceiver base 68 and a hand microphone 70. Fixed mount marine radios 18, 38 are selectively operable to transmit marine radio frequency communications in a sending mode and receive marine radio frequency communications in a receiving mode. Each hand microphone 70 connected to a fixed mount marine radio 18, 38 may include a microphone 72, function keys 74 and push to talk actuator 76. Each hand microphone 70 may receive acoustic inputs for marine radio frequency communication when a fixed mount marine radio 18, 38 is in the sending mode. Push to talk actuator 76 may selectively operate a fixed mount marine radio 18, 38 to which it is attached between the sending mode and the receiving mode. With this arrangement, when push to talk actuator 76 is depressed, acoustic input signals received by microphone 72 are transmitted by the attached fixed mount marine radio 18, 38 over the currently selected marine radio frequency channel. As illustrated, function keys 74 may include 16/9 channel function keys, channel selection keys and hailer keys. A 16/9 channel key tunes the fixed mount marine radio to Channel 16 (156.8 MHz) with one click and to Channel 9 (156.45 MHz) with two clicks. Channel 16 is the international distress, safety and calling channel. Boaters use this channel to get the attention of another station in an emergency. Boats and ships required to carry a fixed mount marine radio maintain a listening watch on this channel, as does the United States Coast Guard. Channel 9 is the boater calling channel established by the Federal Communications Commission (FCC) as a supplementary calling channel for noncommercial vessels and recreational boaters to ease the congestion of Channel 16. Accordingly, the ease of access that the 16/9 channel function provides to Channels 16 and 9 is very valuable on navigable waterways.

Each channel selection key provides easy channel selection with an up arrow that switches to the next channel up and a down arrow that switches to the next channel down. Each hailer key changes the mode of marine communication from wireless to auditory by switching the output of the attached fixed mount marine radio 18, 38 from its antenna 22, 42 to the attached loud speaker 20, 40.

A wireline 78 connects each hand microphone 70 to the fixed transceiver base 68 of a fixed mount marine radio frequency transceiver 18, 38. Each fixed transceiver base 68 includes a speaker 80 that generates sound associated with marine communications when the fixed mount marine radio 18, 38 is in its receiving mode. Push-select knobs 82 facilitate navigation of software menus. Displays 84 display information about the function of fixed marine radios 18, 38 such as the currently tuned channels. Power/volume controls 86 control transceiver power and audio output volume level.

As illustrated, function keys 88 may include distress call keys, menu keys, weather (WX) alert keys, scan memory keys and 16/9 TRI keys. A distress call key sends out a distress call in Digital Selective Calling (DSC). In general DSC is used to establish communications with ship or coast stations or to receive calls from other ships or coast stations. DSC works in conjunction with VHF, MF and HF radio systems and employs a two tone digital signal protocol to selectively call a particular station or to call a group of stations, all stations in a particular geographic area, or to call all stations.

The menu keys provide access to the software menus. The software menus provide features such as a programmable memory. The WX alert keys change the channel to the last used weather channel. Alternatively, the weather alert function may be equipped with Specific Area Message Encoding (SAME). The scan memory keys scan preprogrammed channels. The 16/9/TRI keys access Channel 16 and Channel 9 and provide a triple watch mode. It should be understood by those skilled in the art that although the fixed mount marine radios 18, 38 are illustrated and described above as having certain functions, other functions known in marine radio frequency communications are within the teachings of and do not depart from the present invention. For example, a fixed mount marine radio 18, 38 is often equipped with a squelch control key in order to eliminate output noise when no marine communication or an extremely weak marine communication is received.

Each of the four marine radio remote wireless handsets 26, 46, 50, 52 may maintain one or more wireless links to one or more wireless components of the system 10. As an example, marine radio remote wireless handset 26 is shown maintaining wireless link 56 to fixed mount marine radio frequency transceiver 18 and wireless link 54 to marine radio remote wireless handset 46. Similarly, marine radio remote wireless handset 50 is shown maintaining wireless link 62 to fixed mount marine radio frequency transceiver 38 and wireless link 66 to marine radio remote wireless handset 52. At other times, marine radio remote wireless handset 50 may establish a wireless link (not shown) to marine radio remote wireless handset 26 or marine radio remote wireless handset 46, as examples. In certain embodiments, marine radio remote wireless handset 50 may be capable of establishing a direct wireless link (not shown) to fixed mount marine radio frequency transceiver 18.

In certain embodiments, wireless links between fixed mount marine radios 18, 38 and marine radio remote wireless handsets 26, 46, 50, 52 are established and maintained through the menu systems of fixed mount marine radios 18, 38, which can be controlled via the menu keys described above. Using the menu system, a fixed mount marine radio 18, 38 could be set to establish a wireless link to one or more of marine radio remote wireless handsets 26, 46, 50, 52 and/or another fixed mount marine radio 18, 38. In certain situations, the wireless link(s) may be full-duplex communication links providing for two-way communications between a fixed mount marine radio 18, 38 and other wireless components while in other situations the wireless link(s) may be half-duplex communication links providing for one-way communications. Fixed mount marine radio 18 might, for example, be set to transmit a one-way announcement to a set of other wireless components. Conversely, fixed mount marine radio 18 might be set to monitor, or listen to, a set of other wireless components. As another possibility, the entire wireless marine communication system 10 may be set up to provide full, open conference capability among all of the wireless components. Accordingly, a wide variety of potential wireless link configurations is possible.

In certain embodiments, less than full wireless connection flexibility may be provided for. In one embodiment, only one of the two marine radio frequency transceivers 18, 38 may have the capability to establish wireless links to marine radio wireless handsets 26, 46, 50, 52. In another embodiment, each of the fixed mount marine radio frequency transceivers 18, 38 may have the capability to establish wireless links to one or more marine radio remote wireless handsets, but the marine radio remote wireless handsets linked to one fixed mount marine radio frequency transceiver 18, 38 may not necessarily have the capability to communicate with the marine radio remote wireless handsets linked to the other fixed mount marine radio frequency transceiver 18, 38. FIG. 2 would reflect this embodiment if wireless links 54 and 66 were deleted.

Wireless links 54, 56, 58, 60, 62, 64, 66 are used by the wireless components of system 10 to transmit various forms of data. At certain times, the data transmitted over wireless links 54, 56, 58, 60, 62, 64, 66 may be system handshaking and other data periodically shared between the wireless components. At other times, the data transmitted over wireless links 54, 56, 58, 60, 62, 64, 66 may represent voice data communicated between seamen 24, 44, 48. In the latter mode, an acoustic transducer incorporated within one wireless component converts an acoustic signal to an electrical signal, with is further processed and converted into a wireless signal. The wireless signal is transmitted over one or more of wireless links 54, 56, 58, 60, 62, 64, 66 to one or more other wireless components. At the receiving end of the one or more wireless links 54, 56, 58, 60, 62, 64, 66 the wireless signal is processed and converted to an electrical signal, which is then converted by another acoustic transducer into an acoustic signal at the wireless component receiving the wireless signal. In most embodiments, one or more wireless components at the receiving end of the wireless links 54, 56, 58, 60, 62, 64, 66 will have the capability to transmit a signal as well, thereby facilitating two-way communication. Such a signal may be sent over the same wireless link 54, 56, 58, 60, 62, 64, 66 over which the original signal was received, or may be sent over a separate wireless link 54, 56, 58, 60, 62, 64, 66.

In the embodiment shown in FIG. 2, a push to talk actuator 93 is positioned on the side of each marine radio remote wireless handset 26, 46, 50, 52. Similar to push to talk actuators 76, push to talk actuators 93 selectively operate marine radio remote wireless handsets 26, 46, 50, 52 and in certain embodiments fixed mount marine radios 18, 38 between the sending mode and the receiving mode. In certain embodiments any marine radio remote wireless handset 26, 46, 50, 52 can send a signal to fixed mount marine radio 18, 38 to switch fixed mount marine radio 18, 38 to the send mode whenever the push to talk actuator 93 is depressed. It should be understood by those skilled in the art that although a particular system of control interrupts has been presented, alternative interrupt schemes are within the teachings of the present invention.

Each marine radio remote wireless handset 26, 46, 50, 52 includes a display 92 to provide a functionality similar to display 84 of fixed mount marine radios 18, 38. Functions incorporated into marine radio remote wireless handsets 26, 46, 50, 52 may include menu/hail keys 94, scan memory keys 96, 16/9 TRI keys 98 and WX alert keys 100. These function keys 96, 98, 100 may be essentially identical to the function keys 74 and 88 positioned on the transceiver base of each fixed mount marine radio 18, 38. As briefly described already and as will be described in more detail hereinbelow, when a function is selected on marine radio remote wireless handset 26, 46, 50, 52, the function is sent to fixed mount marine radio 18, 38 where the function is performed and an output is sent back to marine radio remote wireless handset 26, 46, 50, 52. Similar to functions 74 and 88 of fixed mount marine radios 18, 38, other functions known in marine communications may be employed with the marine radio remote wireless handsets 26, 46, 50, 52. Further disclosure of the manner of operation of fixed mount marine radios and marine radio remote wireless handsets is shown and described in U.S. utility patent application Ser. No. 10/206,502 entitled "Mobile Marine Communications Apparatus" filed Jul. 26, 2002, which is hereby incorporated by reference for all purposes and specifically for these teachings.

Within each marine radio remote wireless handset 26, 46, 50, 52 a microphone 102 receives acoustic input for wireless communication to other components of system 10. A scroll/select knob 104 provides a navigation tool for the software menu. A speaker 106 generates acoustic outputs representing the content of received wireless communications. A waterproof casing 108 is disposed about each marine radio remote wireless handset 26, 46, 50, 52 to provide protection from water. Optionally, each marine radio remote wireless handset 26, 46, 50, 52 may include a belt clip or other suitable carrying mechanism. It should be appreciated by those skilled in the art that although only four marine radio remote wireless handsets 26, 46, 50, 52 are presented communicating with fixed mount marine radios 18, 38, more or fewer than four marine radio remote wireless handsets 26, 46, 50, 52 may be employed to communicate with fixed mount marine radios 18, 38.

In a similar manner to that described above with respect to the menu systems for fixed mount marine radios 18, 38, wireless links between fixed mount marine radios 18, 38 and marine radio remote wireless handsets 26, 46, 50, 52 can also be established and maintained through the menu systems of marine radio remote wireless handsets 26, 46, 50, 52, which can be controlled via the menu keys described above. Using the menu system, a marine radio remote wireless handset 26, 46, 50, 52 could be set to establish a wireless link to one or more of marine radio remote wireless handsets 26, 46, 50, 52 and/or a fixed mount marine radio 18, 38. In certain situations, the wireless link(s) may be full-duplex communication links providing for simultaneous two-way communications between a marine radio remote wireless handset 26, 46, 50, 52 and other wireless components while in other situations the wireless link(s) may be half-duplex communication links, providing communications in only one direction at a time. A marine radio remote wireless handset 26, 46, 50, 52 might, for example, be set to transmit a one-way announcement to a set of other wireless components. Conversely, a marine radio remote wireless handset 26, 46, 50, 52 might be set to monitor, or listen to, a set of other wireless components. As another possibility, the entire wireless marine communication system 10 may be set up to provide full, open conference capability among all of the wireless components. Accordingly, a wide variety of potential wireless link configurations is possible.

In the embodiment shown in FIG. 2 each marine radio remote wireless handset 26, 46, 50, 52 includes a channel selection mechanism 90. By turning channel selection mechanism 90 to the left or right, a marine radio channel may be selected. The marine radio remote wireless handset 26, 46, 50, 52 relays the channel selection to the connected fixed mount marine radio 18, 38 on a frequency, such as 900 MHz, 2.4 Ghz or 5.8 Ghz. The fixed mount marine radio 18, 38 then tunes in to the selected channel and relays marine communications to the marine radio remote wireless handset 26, 46, 50, 52. Fixed mount marine radio 18, 38 may tune into Coast Guard Channel 22A (157.1 MHz), the "piloting" Channel 13 (156.65 MHz) or ship-to-ship safety Channel 6 (156.3 MHz), for example.

Figure 3:
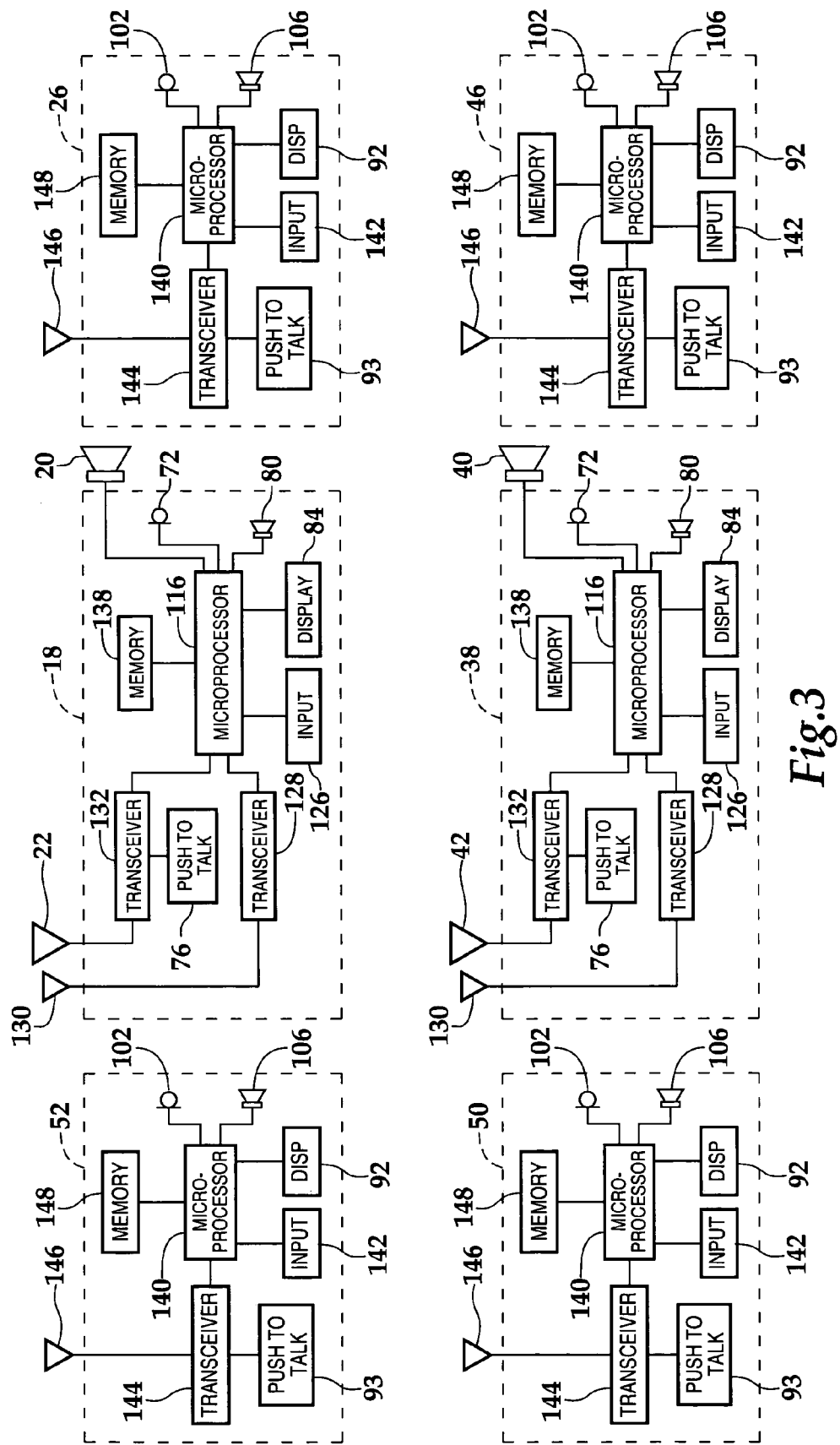
FIG. 3 is a functional block diagram of the wireless marine communications system of the present invention.

Referring now to FIG. 3, the marine communications system 10 of FIG. 2 is depicted in a functional block diagram. Fixed mount marine radios 18, 38 and marine radio remote wireless handsets 26, 46, 50, 50 are operable to form mutual wireless links as depicted in FIG. 2. Fixed mount marine radios 18, 38 and marine radio remote wireless handsets 26, 46, 50, 52 may communicate at 900 MHz, 2.4 Ghz, 5.8 Ghz or other frequencies in the narrowband Personal Communications Spectrum (PCS) spectrum.

A microprocessor 116 controls the operations of each fixed mount marine radio 18, 38. Loud speakers 20, 40 are electrically coupled to the microprocessors 116 and positioned outside fixed mount marine radios 18, 38 as depicted by the placement outside the dashed lines. When a fixed mount marine radio 18, 38 is in the sending mode and the hailer function is activated, microprocessor 116 routes the marine communication through the respective loud speaker 20, 40 for local auditory marine communications. Microphones 72 and speakers 80 are electrically coupled to microprocessors 116. A microphone 72 receives sound for marine communication when the fixed mount marine radio 18, 38 is in the sending mode. A speaker 80 generates sound associated with received marine communications when the fixed mount marine radio 18, 38 is in the receiving mode.

Displays 84 are electrically coupled to microprocessors 116 to provide visual output for data such as the status of the hailer function and the current channel, for example. Inputs 126 are coupled to microprocessors 116. Inputs 126 represents functions such as volume control and 16/9 key, as examples. Transceivers 128 are electrically coupled to microprocessors 116 to convert received radio frequency signals into electrical signals for processing by microprocessors 116 and to convert electrical signals into radio frequency signals for transmission. Transceivers 128 send and receive radio frequency signals via antenna 130. Transceivers 128 and antennas 130 communicate with marine radio remote wireless handsets 26, 46, 50, 52 via wireless links 56, 58, 60, 62.

Similarly, transceivers 132 are electrically coupled to microprocessors 116 to convert received marine radio frequency signals into electrical signals for processing by microprocessor 116 and to convert electrical signals into radio frequency signals for transmission. Push to talk actuators 76 operate transceivers 132 and fixed mount marine radios 18, 38 between sending and receiving modes. Antennas 22, 42 radiate radio frequency signals toward remote stations, such as remote ship stations or coast stations, and receive radio frequency waves from remote stations. Memory modules 138 store the data necessary for the operation of fixed mount marine radios 18, 38. Although fixed mount marine radios 18, 38 are illustrated with a particular configuration, fixed mount marine radios 18, 38 may have a different configuration. For example, the transceivers 128 and antennas 130 may be separate units connected to the fixed mount marine radios 18, 38 via an input port (not shown). Moreover, antennas 22, 42 may represent antenna arrays rather than discrete antennas. Additionally, fixed mount marine radios 18, 38 may employ any power source such as a DC connection to a ship generator or batteries.

Marine radio remote wireless handsets 26, 46, 50, 52 incorporate many components similar to those found in fixed mount marine radios 18, 38. For example, a microprocessor 140 controls the operations of each marine radio remote wireless handset 26, 46, 50, 52. A microphone 102 and speaker 106 within each marine radio remote wireless handset 26, 46, 50, 52 is coupled to the microprocessor 140. As described above, each microphone 102 converts acoustic inputs to electrical signals. Each speaker 106 converts electrical signals to acoustic outputs. Displays 92 and inputs 142 are coupled to microprocessors 140 and operate similar to displays 84 and inputs 126. Transceivers 144 are electrically coupled to microprocessors 140 to convert received radio frequency signals into electrical signals for processing by microprocessor 140 and to convert electrical signals into radio frequency signals for transmission. Push to talk actuators 93 switch transceivers 144 between sending and receiving modes for marine frequency communications via a fixed mount marine radio 18, 38. Antennas 146 radiate radio frequency waves to and receive radio frequency waves from fixed mount marine radios 18, 38, and marine radio remote wireless handsets 26, 46, 50, 52 and more specifically, antennas 130. Each combination of microprocessor 140, transceiver 144, push to talk actuator 93 and antenna 146 constitutes a complete radio-frequency communication apparatus. It should be understood, however, that a marine radio remote wireless handset may comprise additional or different electronic communication elements, only some of which are depicted in FIG. 3. As seen in FIG. 3, a memory module 148 may be included to store the data necessary for the operation of each marine radio remote wireless handset 26, 46, 50, 52. Preferably, marine radio remote wireless handset 26, 46, 50, 52 is powered by a battery (not shown).

Figure 4:
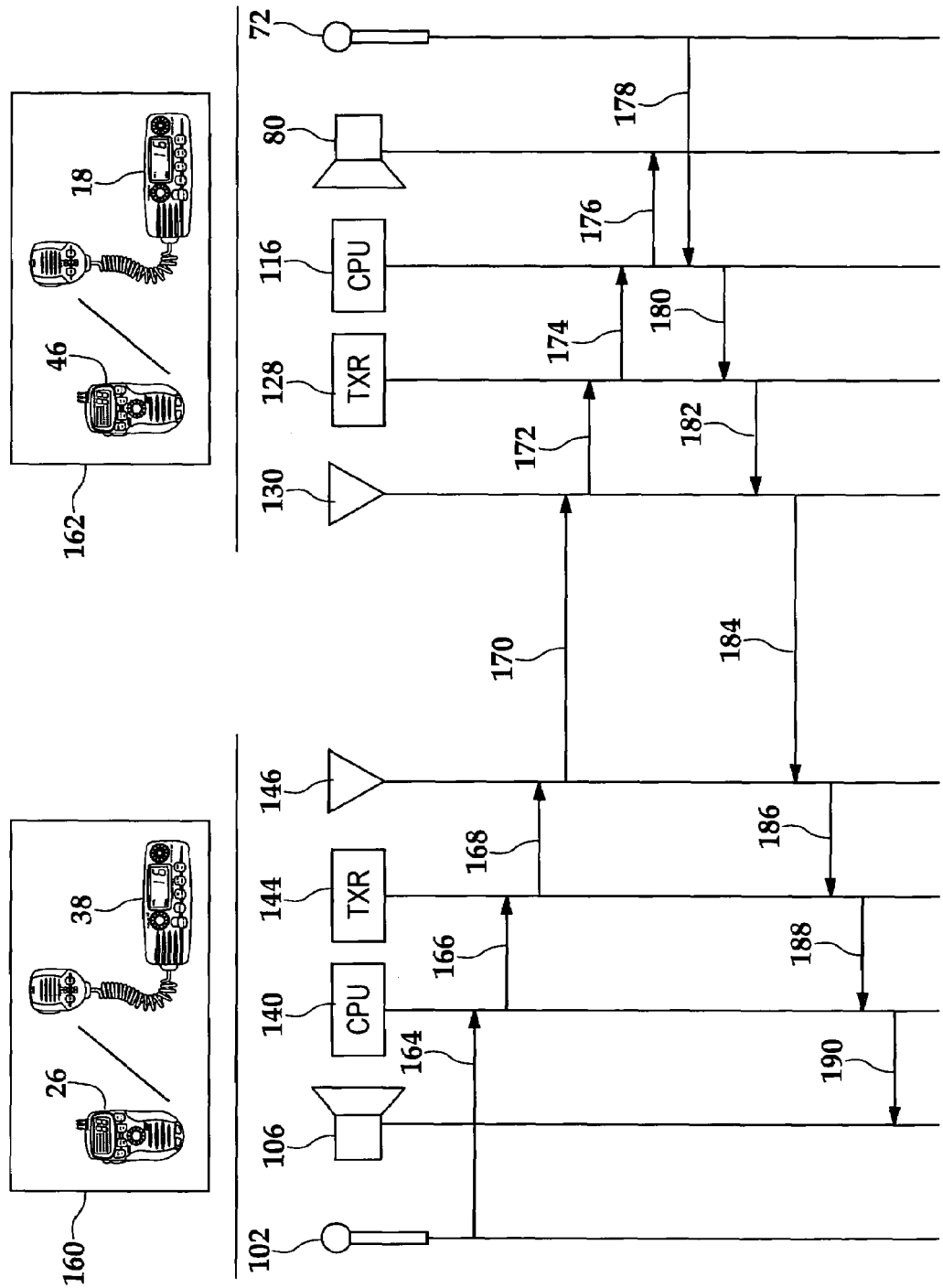
FIG. 4 is a message flow diagram depicting a message flow within the wireless marine communications system of the present invention.

FIG. 4 depicts a message flow diagram depicting the flow of a wireless communication through marine wireless communication system 10. As seen in FIG. 4, the flow of a marine radio wireless communication proceeds in much the same manner without respect to whether the communication originates at marine radio remote wireless handset 26 or fixed mount marine radio frequency transceiver 38. Similarly, the flow of the communication will proceed in generally the same manner without respect to whether the communication is directed to marine radio remote wireless handset 46 or fixed mount marine radio frequency transceiver 18. Further, any other wireless enabled apparatus, including but not limited to a wireless enabled handheld marine radio, could be used to send or receive wireless communications in the manner described herein. Accordingly, the following written description of FIG. 4 relates to any such communications between wireless marine radio components and will be described with reference to marine radio remote wireless handset 26 and fixed mount marine radio frequency transceiver 18 for purposes of illustration.

A wireless communication originating at marine radio remote wireless handset 26 could begin as an acoustic input (not shown) received at microphone 102, which converts the acoustic input to an electrical signal 164. Electrical signal 164 is communicated to the microprocessor 140, which sends a repeated electrical signal 166 to the transceiver 144. The repeated electrical signal 166 is converted in the transceiver 144 to a radio frequency signal 168, which is transmitted from antenna 146 across wireless link 56 (see FIG. 2) in the form of wireless signal 170.

Wireless signal 170 is received by fixed mount marine radio 18 via antenna 130, which communicates radio frequency signal 172 to transceiver 128. Radio frequency signal 172 is converted by transceiver 128 to electrical signal 174, which is communicated to microprocessor 116 and repeated to speaker 80 in the form of electrical signal 176. Speaker 80 then converts electrical signal 176 to an acoustic output (not shown).

A response to the original wireless message may originate in the form of an acoustic input signal (not shown) to microphone 72 of fixed mount marine radio 18. Microphone 72 converts the acoustic input signal to an electrical signal 178, which is communicated to microprocessor 116 and repeated to transceiver 128 in the form of electrical signal 180. Transceiver 128 converts electrical signal 180 to radio frequency signal 182, which is communicated to antenna 130 and then across wireless link 56 in the form of wireless signal 184.

Wireless signal 184 is received by antenna 146 of marine radio remote wireless handset 26, at which point it is communicated to transceiver 144 in the form of radio frequency signal 186. Transceiver 144 converts radio frequency signal 186 to an electrical signal 188, which is communicated to microprocessor 140, repeated to speaker 106 in the form of electrical signal 190, and converted to an acoustic output (not shown) by speaker 106.

Figure 5:
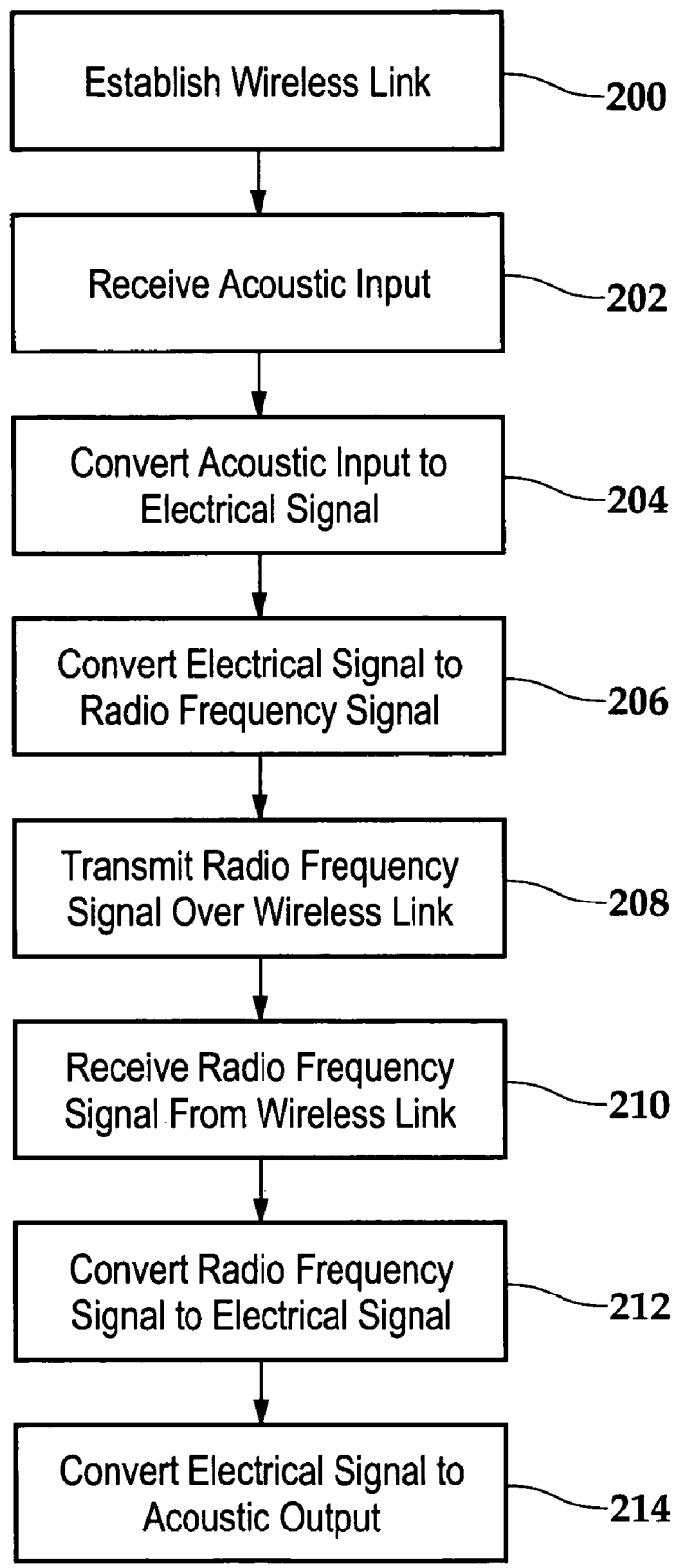
FIG. 5 is a flow chart depicting a method of communication within the wireless marine communications system of the present invention.

The above-described process of wireless communication is depicted in flowchart form in FIG. 5. Process flow begins in block 200, where a wireless link is established between two wireless components of system 10. In block 202, an acoustic input is received at one of the wireless components. This acoustic input is converted to an electrical signal in block 204. The electrical signal is converted to a radio frequency signal in block 206, which is transmitted over the wireless link in block 208. The radio frequency signal is received by the other wireless component in block 210 and converted to an electrical signal in block 212. Finally, the electrical signal is converted to an acoustic output in block 214.

FIGS. 6–8 depict a handheld marine radio 250 suitable to be modified for use with the wireless communications system described above. Handheld marine radio 250 comprises display 252, inputs 254, control knob 256, marine radio antenna 258, microphone 260, selection knob 262 and speaker 264 disposed within handheld marine radio case 266. Push-to-talk actuator 268 is disposed on the side of handheld marine radio case 266. These elements and structures have functions in handheld marine radio 250 corresponding to the same elements and structures described above in connection with fixed mount marine radio 18. Battery pack 270 is disposed on the back of marine radio case 266, and is retained within battery cavity 274 by battery retainer clip 272. As shown in FIGS. 6–8, handheld marine radio 250 incorporates the capability to communicate via a selected one of a number of marine radio frequencies in a similar manner to that described in connection with fixed mount marine radio 18. Internally, handheld marine radio 250 will generally include at least a marine radio frequency transceiver, a microprocessor and memory, as described in more detail below in connection with FIG. 14. Handheld marine radio 250 has the advantage over fixed mount marine radio 18 in that it is handheld and portable. Handheld marine radio 250 has the disadvantage of a limited power, range and battery life as compared to fixed mount marine radio 18. Further, handheld marine radio does not incorporate a local wireless transceiver similar to transceiver 128 of fixed mount marine radio 18, and can therefore not communicate over the local shipboard wireless channels. Accordingly, handheld marine radio 250 cannot communicate via local shipboard wireless channels with the components of the wireless communications system 10 described above in connection with FIGS. 1–5. Except for these limitations, handheld marine radio 250 has the potential to include most, if not all, of the same marine radio frequency communication functionality as fixed mount marine radios 18, 38.

Figure 12:
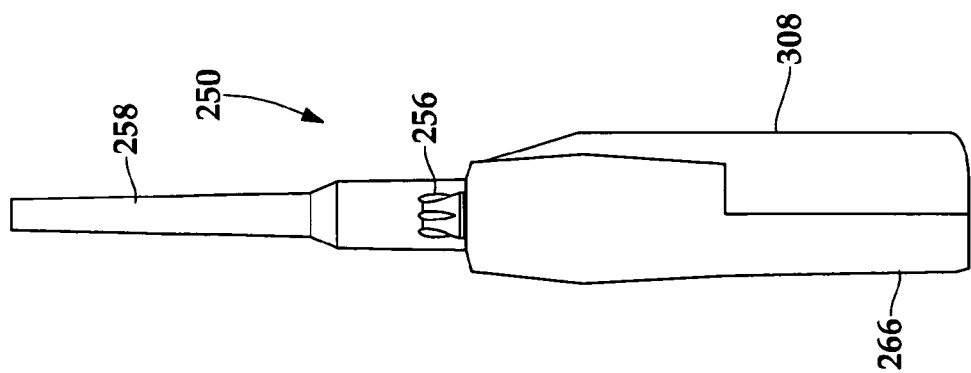
FIG. 12 is a side elevation view of the handheld marine radio of the present invention with an alternate wireless transceiver module installed.
Figure 11:
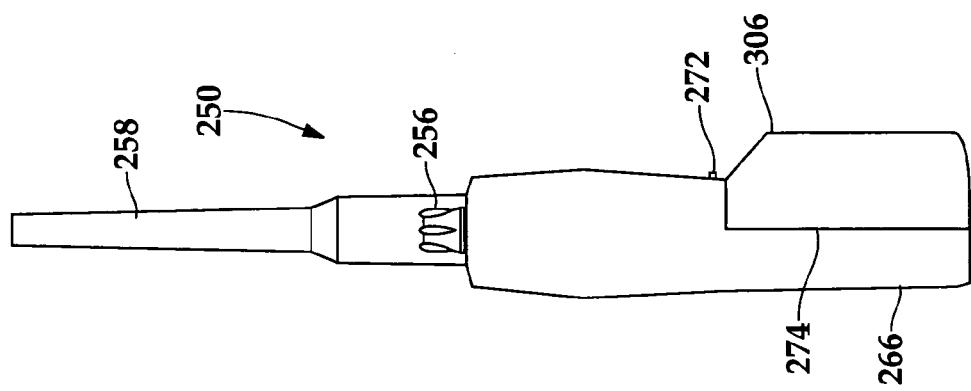
FIG. 11 is a side elevation view of the handheld marine radio of the present invention with a wireless transceiver module installed in place of the battery pack.
Figure 10:
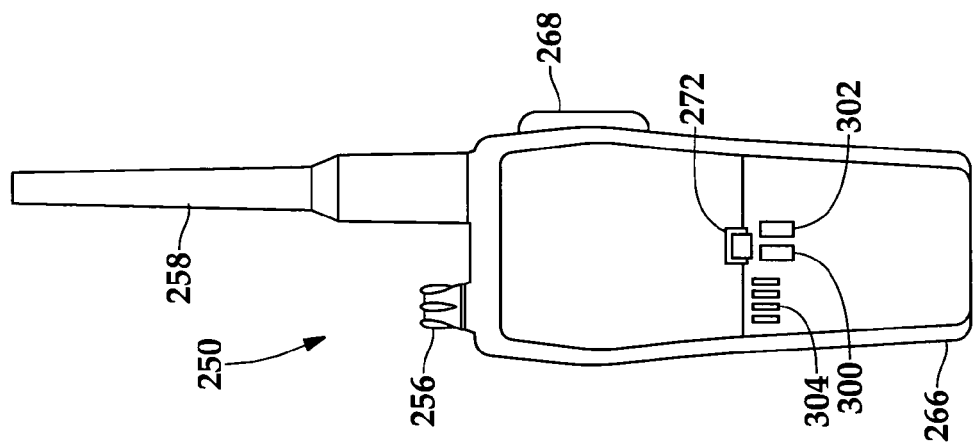
FIG. 10 is a back elevation view of the handheld marine radio of the present invention with the battery pack removed.
Figure 9:
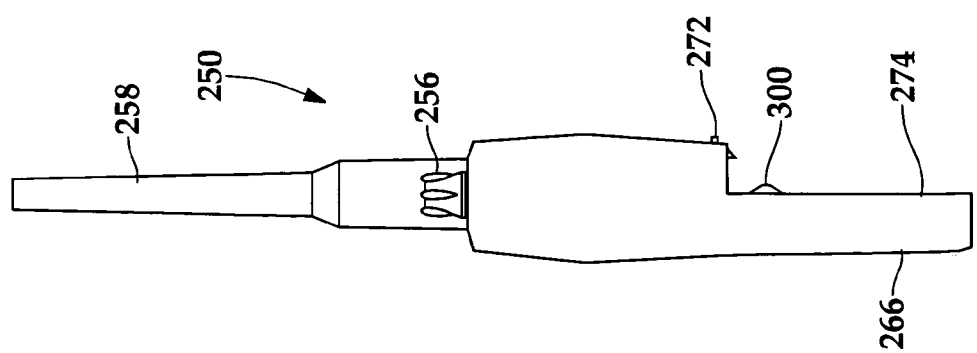
FIG. 9 is a side elevation view of the handheld marine radio of the present invention with the battery pack removed.

FIGS. 9–12 depict variations on handheld marine radio 250 as shown in FIGS. 6–8. Specifically, FIGS. 9 and 10 depict handheld marine radio 250 with battery pack 270 removed, while FIGS. 11 and 12 depict handheld marine radio 250 with alternate modules installed in place of battery pack 270. In FIGS. 9 and 10, additional structure can be seen which was not apparent in FIGS. 6–8. Specifically, these figures depict battery contact 300 and battery contact 302 along with signal connector 304. Battery contact 300 and battery contact 302 are used for transmission of electrical power from battery pack 270 to handheld marine radio 250. In certain embodiments, signal connector 304 may be used to monitor the charge in battery pack 270. Signal connector 304 can also be used to provide any necessary communication between handheld marine radio 250 and battery pack 270 or any other module disposed in battery cavity 272. Depending on the particular application, signal connector 304 may be a physical array of conductors designed for direct contact with corresponding conductors, or may be an RF antenna, optical emitter/detector pair, inductive coupling structure or any other suitable communications apparatus. In one embodiment, signal connector 304 is a BLUETOOTH® antenna. In another embodiment, signal connector 304 is an IrDA compatible infrared communications apparatus.

FIGS. 11 and 12 depict handheld marine radio 250 with wireless transceiver module 306 and wireless transceiver module 308 installed, respectively, in battery cavity 274 in place of battery pack 270. Wireless transceiver modules 306, 308 are designed to provide local shipboard wireless capability to handheld marine radio 250. Wireless transceiver module 306 is designed for applications where the profile and size of handheld marine radio 250 is not critical. Wireless transceiver module 308 is designed for applications where it is desirable to keep the profile and size of handheld marine radio 250 closer to the original envelope. Either wireless transceiver module 306 or wireless transceiver module 308 provide handheld marine radio 250 with the capability to communicate wirelessly with the components of the shipboard wireless communications system 10, including fixed mount marine radio 18 and marine radio remote wireless handset 26. The frequencies over which wireless transceiver modules 306, 308 will correspond to the frequencies used by wireless communications system 10. In certain embodiments, wireless transceiver modules 306, 308 may communicate over one or more of 900 MHz, 2.4 GHz and 5.8 GHz. Generally, both wireless transceiver module 306 and wireless transceiver module 308 will include a battery in addition to the transceiver hardware. This is necessary owing to the fact that wireless transceiver module 306 and wireless transceiver module 308 are designed to replace battery pack 270. Handheld marine radio 250 would normally retain the capability to communicate via marine radio frequencies with remote stations via an internal marine radio transceiver and marine radio antenna 258, as wireless transceiver module 306 is intended to supplement, rather than replace, the internal marine radio transceiver of handheld marine radio 250. In certain embodiments, handheld marine radio 250 will incorporate the control circuitry and/or control software for the wireless transceiver modules 306, 308 within the radio itself. In other embodiments, the wireless transceiver modules 306, 308 may be self-contained units incorporating their own control circuitry and software, relying on the handheld marine radio 250 only for user-interface functionality.

Figure 13:
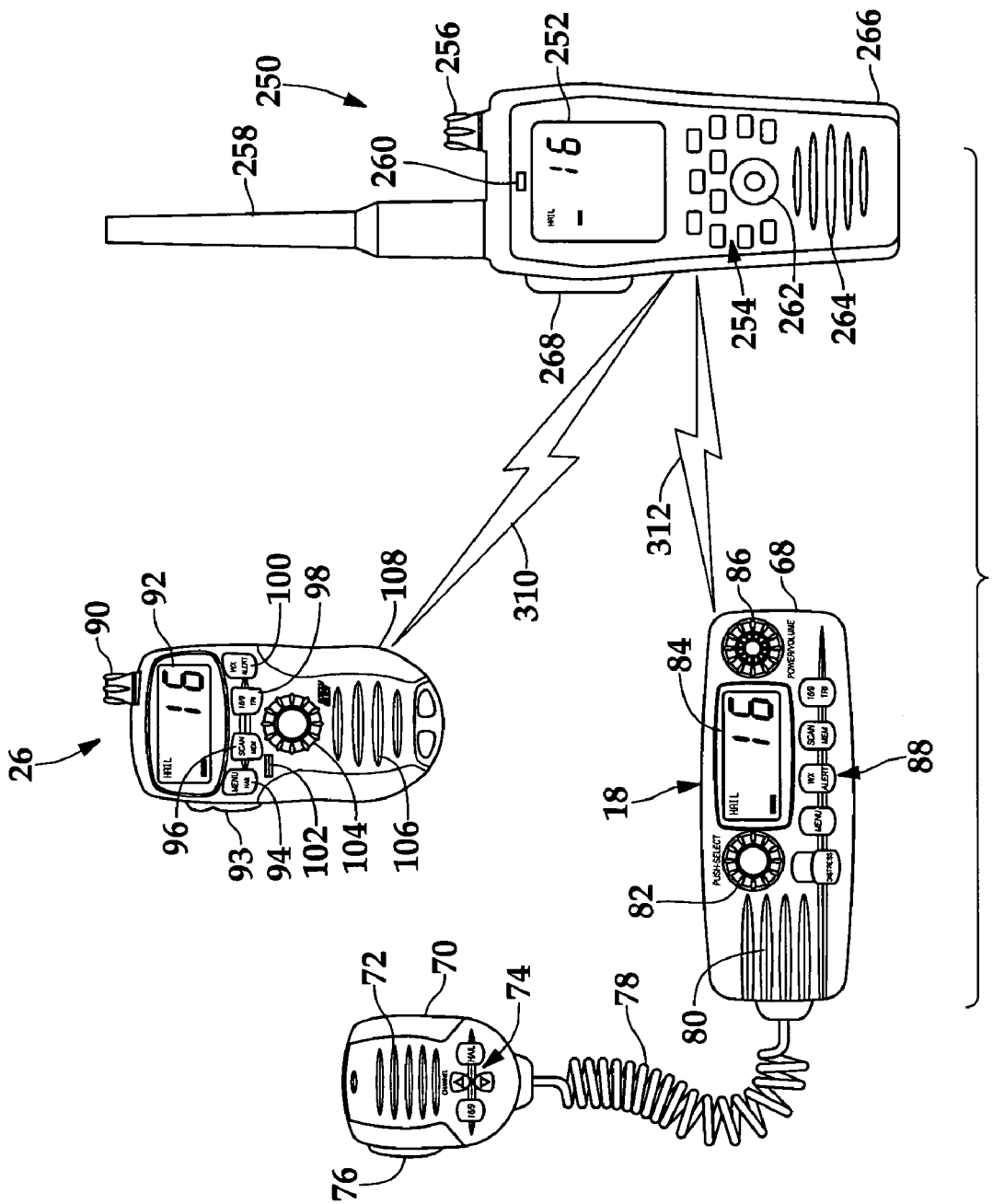
FIG. 13 is a schematic view of a marine wireless communications system of the present invention incorporating the handheld marine radio of the present invention.
Figure 14:
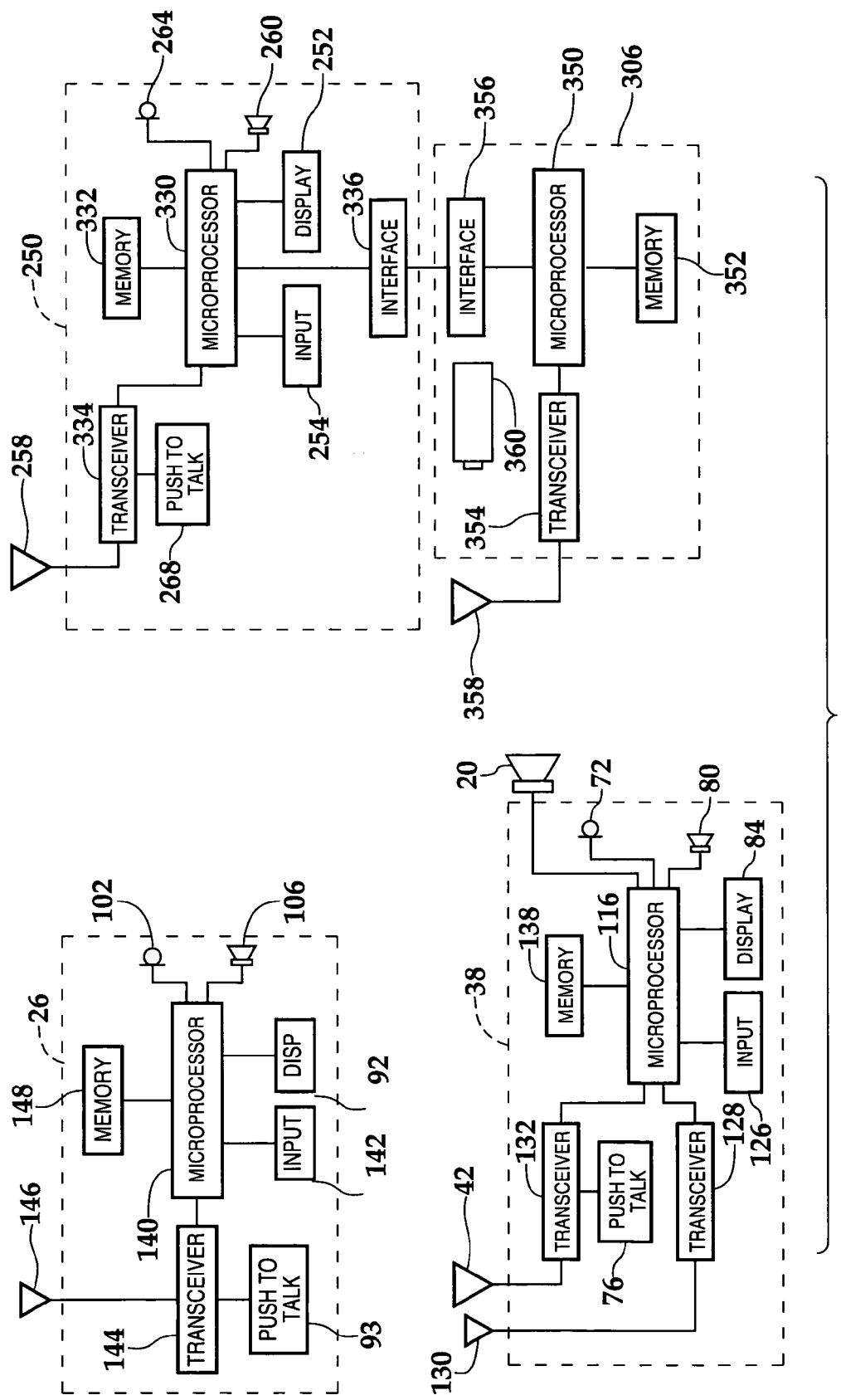
FIG. 14 is a functional block diagram of the marine wireless communications system of the present invention.

FIGS. 13 and 14 depict fixed mount marine radio 18, marine radio remote wireless handset 26 and handheld marine radio 250 in a schematic manner. With wireless transceiver module 306 or wireless transceiver module 308 installed, handheld marine radio 250 can function in a similar manner to fixed mount marine radios 18, 38, including local shipboard wireless capability. Specifically, handheld marine radio 250 retains its original functionality to communicate via marine radio channels, but can also include the capability to communicate with fixed mount marine radio 18 and/or marine radio remote wireless handset 26 via local shipboard wireless links 310, 312, owing to the addition of wireless transceiver module 306 or wireless transceiver module 308.

The internal components of fixed mount marine radio 18 and marine radio remote wireless handset 26 have been discussed in detail above in connection with FIGS. 2 and 3 and are not repeated here. In addition to the external components discussed above in connection with FIGS. 6–8, the internal components of handheld marine radio 250 include microprocessor 330, memory 332, marine radio transceiver 334 and interface 336. Microprocessor 330 controls and coordinates the operation of handheld marine radio 250 according to software instructions stored in memory 332. Marine radio transceiver 334 controls transmission and receipt of marine radio frequency signals via marine radio antenna 258 under the control of push-to-talk actuator 268. Interface 336 controls the communication between microprocessor 330 and signal connector 304 within battery cavity 274.

The internal components of wireless transceiver module 306 include microprocessor 350, memory 352, wireless transceiver 354, interface 356, wireless antenna 358 and battery 360. microprocessor 350 controls the operation and coordination of components within wireless transceiver module 306 in a similar manner to microprocessor 140 of wireless handset 26. Memory 352 stores any data and instructions necessary for the operation of wireless transceiver module 306. Wireless transceiver 354 acts as an interface between microprocessor 350 and wireless antenna 358, converting electrical signals from microprocessor 350 into RF signals, and vice versa. Interface 356 acts as an interface between microprocessor 350 and interface 336 of handheld marine radio 250.

With detachable wireless transceiver module 306 installed, handheld marine radio 250 is also able to operate in a similar manner to marine radio remote wireless handsets 26, 46, 50, 52 described above. In certain embodiments, wireless enabled handheld marine radio 250 may be programmed to default to wireless microphone functionality within a certain range of a fixed mount marine radio 18, 38, and to default to marine radio functionality outside of that range. In certain embodiments, the range may be user-adjustable. In wireless microphone mode, microphone 260 converts acoustic inputs to electrical signals for transmission via a wireless link. Similarly, speaker 264 converts electrical signals received via a wireless link to acoustic outputs. Display 252 and inputs 254 are coupled to microprocessor 330 for control and feedback. Transceiver 334 is electrically coupled to microprocessor 330 to convert received radio frequency signals into electrical signals for processing by microprocessor 330 and to convert electrical signals into radio frequency signals for transmission. In addition to its normal function of controlling transceiver 334, push to talk actuator 268 may be operable to switch wireless transceiver 354 between sending and receiving modes for marine frequency communications via a fixed mount marine radio 18, 38. Antenna 358 radiates radio frequency waves to and receives radio frequency waves from fixed mount marine radios 18, 38, and marine radio remote wireless handsets 26, 46, 50, 52. The combination of microprocessors 330, 350, transceivers 334, 354, push to talk actuator 268 and antennas 258, 358 constitute a complete radio-frequency communication apparatus. It should be understood, however, that a particular handheld marine radio may comprise additional or different electronic communication elements, only some of which are depicted in FIGS. 13 and 14.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A detachable wireless transceiver module for facilitating communications between a handheld marine radio and a first wireless marine radio component of a marine radio frequency communication system disposed on-board a waterborne vessel, the detachable wireless transceiver module comprising:
    a module case having an outer surface;
    a battery disposed within the case;
    transceiver battery contacts operably connected to the battery, disposed on the outer surface of the module case in a manner to provide connection to corresponding handheld radio contacts disposed on an outer surface of the handheld marine radio;
    a transceiver signal connector, disposed on the outer surface of the module case in such a manner as to provide connection to a handheld marine radio signal connector disposed on an outer surface of the handheld marine radio;
    a transceiver interface adapted to communicate with the handheld marine radio via the transceiver signal connector; and
    a wireless transceiver, operably connected to the transceiver interface and adapted to establish a wireless communication link with the first wireless marine radio component and to transmit a wireless signal incorporating an acoustic input signal over the wireless communication link.

2. The detachable transceiver module as recited in claim 1 wherein the first wireless marine radio component is a marine radio remote wireless handset.

3. The detachable transceiver module as recited in claim 1 wherein the first wireless marine radio component is a fixed mount marine radio frequency transceiver.

4. The detachable transceiver module as recited in claim 1 wherein the wireless transceiver is capable of communicating with the first wireless marine radio component and a second wireless marine radio component concurrently.

5. The detachable transceiver module as recited in claim 1 wherein the wireless transceiver is operable to control a fixed mount marine radio via a wireless link.

6. The detachable transceiver module as recited in claim 5 wherein the wireless transceiver is operable to initiate the transmission of a marine radio signal from the fixed mount marine radio.

7. A handheld marine radio operable to communicate within a marine radio frequency communication system disposed on-board a waterborne vessel, the handheld marine radio comprising:
   a marine radio transceiver component comprising:
   a marine radio transceiver case having an outer surface;
   a microphone, disposed within the marine radio transceiver case;
   a speaker, disposed within the marine radio transceiver case;
   at least two handheld radio battery contacts disposed in the outer surface of the marine radio transceiver case;
   a handheld radio signal connector disposed in the outer surface of the marine radio transceiver case;
   a marine radio transceiver, disposed within the marine radio transceiver case, operable to transmit and receive marine radio channel communications;
   a first antenna operably connected to the marine radio transceiver; and
   a microprocessor operably connected to the microphone, the speaker, the marine radio transceiver and the handheld radio signal connector; and
   a detachable wireless transceiver module comprising;
   a module case having an outer surface;
   a battery disposed within the module case;
   at least two transceiver module battery contacts operably connected to the battery, disposed in the outer surface of the module case in a manner to provide connection to the handheld radio battery contacts;
   a transceiver signal connector, disposed in the outer surface of the module case in such a manner as to provide connection to the handheld radio signal connector;
   a transceiver interface adapted to communicate with the handheld radio signal connector via the transceiver signal connector; and
   a wireless transceiver, operably connected to the transceiver interface and adapted to establish a wireless communication link with a first wireless marine radio component and to transmit a wireless signal incorporating an acoustic input signal over the wireless communication link.

8. The handheld marine radio as recited in claim 7 wherein the first wireless marine radio component is a marine radio remote wireless handset.

9. The handheld marine radio as recited in claim 7 wherein the first wireless marine radio component is a fixed mount marine radio frequency transceiver.

10. The handheld marine radio as recited in claim 7 wherein the wireless transceiver is capable of transmitting at least one frequency equal to one of 900 MHz, 2.4 Ghz and 5.8 Ghz.

11. The handheld marine radio as recited in claim 7 wherein the wireless transceiver is capable of communicating with the first wireless marine radio component and a second wireless marine radio component concurrently.

12. The handheld marine radio as recited in claim 7 wherein the wireless transceiver is operable to control a fixed mount marine radio via a wireless link.

13. The handheld marine radio as recited in claim 12 wherein the wireless transceiver is operable to initiate the transmission of a marine radio signal from the fixed mount marine radio.

14. A wireless marine radio system comprising:
   a handheld marine radio having
      a first microphone,
      a first speaker,
      a marine radio transceiver disposed within a marine radio case having marine radio battery contacts disposed therein,
      a first local wireless transceiver disposed within a detachable wireless transceiver module outside of the marine radio case and operably connected to a first local wireless antenna disposed within the detachable wireless transceiver module,
      a battery disposed within the detachable wireless transceiver module,
      battery contacts disposed in an outer surface of the detachable wireless transceiver module, operably connected to the battery and to the marine radio battery contacts and
      a first processor operable to coordinate communication between the first microphone, the first speaker and the first local wireless transceiver; and
   a wireless marine radio component having
      a second microphone,
      a second speaker,
      a second local wireless transceiver operably connected to a second local wireless antenna and
      a second processor operable to coordinate communication between the second microphones the second speaker and the second local wireless transceiver;
   wherein the handheld marine radio and second local wireless transceiver are operable to establish a local wireless link through the first and second local wireless antennas; and
   wherein each of the first and second processors communicate signals from the respective first and second microphones across the wireless link and communicate signals received across the wireless link to the respective first and second speakers.

15. The wireless marine radio system as recited in claim 14 wherein the first wireless marine radio component is a marine radio remote wireless handset.

16. The wireless marine radio system as recited in claim 14 the first wireless marine radio component is a fixed mount marine radio frequency transceiver.

17. The wireless marine radio system as recited in claim 14 wherein the wireless transceiver is capable of transmitting at least one frequency equal to one of 900 MHz, 2.4 Ghz and 5.8 Ghz.

18. The wireless marine radio system as recited in claim 14 wherein the wireless transceiver is capable of communicating with the first wireless marine radio component and a second wireless marine radio component concurrently.

19. The wireless marine radio system as recited in claim 14 wherein the wireless transceiver is operable to control a fixed mount marine radio via a wireless link.

* * * * *